April 4, 1939.  J. MIHALYI  2,153,198
RANGE AND VIEW FINDER SYSTEM FOR CAMERAS
Filed Aug. 1, 1936

INVENTOR.
Joseph Mihalyi
BY
ATTORNEYS

Patented Apr. 4, 1939

2,153,198

UNITED STATES PATENT OFFICE 2,153,198

RANGE AND VIEW FINDER SYSTEM FOR CAMERAS

Joseph Mihalyi, Rochester, N. Y., assignor, by mesne assignments, to Eastman Kodak Company, Jersey City, N. J., a corporation of New Jersey Application August 1, 1936, Serial No. 93,824

1 Claim. (Cl. 88—2.6)

My present invention relates to photographic cameras provided with range and view finder systems, and more particularly to an improved construction for a combined range and view finder system.

In providing cameras with range finders and view finders it has been customary to couple the movable part of the range finder with the focusing adjustment of the camera, so that the camera is always in focus for the distance at which the range finder is adjusted. Many arrangements have been proposed whereby the view finder is mounted with its observation window near to the observation window of the range finder, so that the observer need shift his eye but a small amount in changing from the view finder to the range finder. It has also been proposed in connection with base type range finders to so construct them that one of the range finder beams is simultaneously employed for showing the field of view. However, such an arrangement requires special range finder optical parts, and in some cases it is not conducive to an exact functioning of the range finder.

It is an object of my invention to provide a combined range and view finder system which is particularly adapted for mounting on a camera and which makes use of a common ocular or observation window for both the range finder and the view finder.

Another object of my invention is to provide a combined range and view finder system which is so constructed and arranged that the user may observe through a single observation window, both the range finder images and the view finder image, either simultaneously or selectively.

Other objects and advantages of my invention will appear from the following description when read in connection with the accompanying drawing, and its scope will be pointed out in the appended claim.

In the drawing forming a part of this disclosure:

According to the invention, a base type range finder, including two spaced beam collecting members and a beam combining unit, is provided with an ocular or viewing window having an axis perpendicular to the base line of the range finder. A view finder is also provided with an optical axis which substantially coincides with the ocular axis of the range finder, whereby the range and view finder fields are viewed through a single ocular or observation opening.

Figure 1:
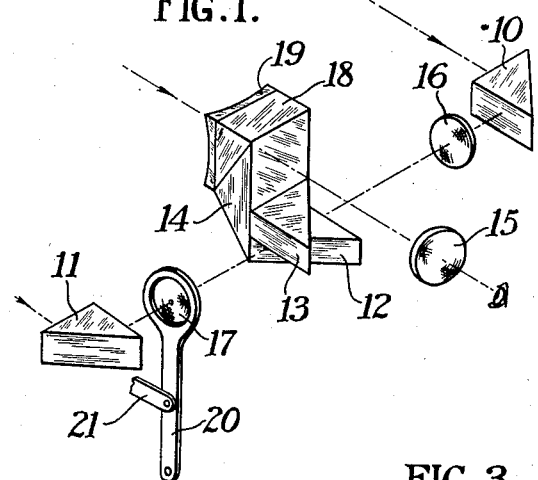
Fig. 1 is a view in perspective of the optical parts of one form which my invention may take.

In Fig. 1, one form of the invention is illustrated as comprising two spaced light deflecting elements, such as right-angled prisms 10 and 11, which, in a well known manner, accept two spaced beams of light and direct them along the base line formed by the members 10 and 11. For combining these two beams there is provided between the members 10 and 11 and in the base line of the range finder, a beam combining unit comprising right-angled prisms 12 and 13 which receive the rays directed thereto by the end members 10 and 11, respectively, and direct them through an additional right-angled prism 14, which, in turn, directs these beams rearwardly through an observation window, such as that formed by an ocular lens 15.

It will be evident that the prism assembly 12, 13 and 14 constitutes a modified porro prism erecting system and functions in a well known manner. Although the range finder just described may be of the zero magnification type, I prefer to make it telescopic, as shown in Fig. 1, by providing objective lenses 16 and 17 in the base line of the finder, and these objectives are of such focal length as to form their respective images on the face of the prism 14, to which the prisms 12 and 13 are cemented. The junction of the adjacent edges of the prisms 12 and 13 thus forms a dividing line between the upper and lower fields of the range finder, and this divided image is viewed through the prism 14 by means of the ocular 15 which thus becomes the eyepiece for the objective lenses 16 and 17.

In accordance with my invention, I also employ the ocular 15 as the eye-piece of a view finder, and such an arrangement is provided by cementing to the upper reflecting surface of the prism 14, which is "half-tone" plated, a rightangled prism 18, which cemented surface, as is well known, forms a semi-transparent, semi-reflecting surface. On the front surface of the prism 18, I position a lens element 19 which becomes the field lens of a view finder, having the ocular 15 as its eyelet lens. The view finder field lens 19 may be spaced in front of the prism 18, but I prefer to cement it thereto so as to provide a more compact construction and to reduce light losses due to air glass surfaces.

Figure 2:
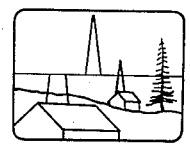
Fig. 2 shows the combined view finder and range finder fields as observed through the arrangement shown in Fig. 1.

In the arrangement above described, the field of view will be visible to an observer through the ocular 15, the semi-transparent surface between the prisms 14 and 18 and the view finder field lens 19. There will also be visible to the observer through the ocular 15 and the semi-reflecting surface between the prisms 14 and 18, the range finder images formed by the objective lenses 16 and 17. These two sets of images will appear to the observer somewhat as is shown in Fig. 2, the entire frame defining, without mutilation, the field as seen through the view finder, and the mutilated image of the steepled building being defined by the dividing line passing horizontally through the frame. The telescopic action of the range finder greatly enlarges the range finder image relatively to the view finder image, so that confusion between the two is avoided.

When the combined range and view finder system described in connection with Fig. 1 is mounted on a camera, the focusing adjustment of the camera is preferably coupled to the range finder in some well known manner, and for this purpose I have shown the objective lens 17 mounted in a pivoted member 20 which is provided with a link member 21 for coupling it to the camera focusing adjustment. One suitable coupling arrangement is shown in my Patent No. 1,991,110, although it will be obvious that any other suitable coupling may be employed.

Figure 3:
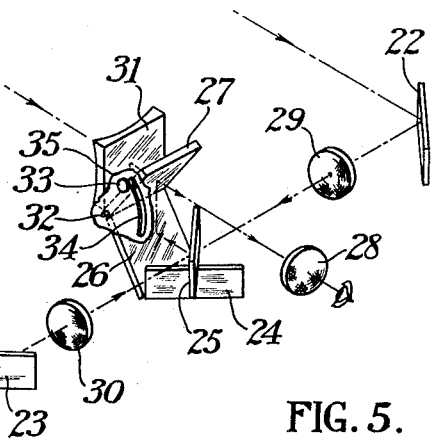
Fig. 3 is a view in perspective of an arrangement similar to Fig. 1, but modified for observing selectively the range and view finder fields.

The form of the invention illustrated in Fig. 3 is functionally the same as that shown in Fig. 1. In Fig. 3 the several light deflecting members are shown as comprising suitably arranged mirrors, instead of the prisms shown in Fig. 1. In this arrangement mirrors 22 and 23 define the ends of the base line of the range finder, and the beam combining and erecting system comprises suitably arranged mirrors 24, 25, 26 and 27 which combine and direct, through the ocular 28, the image-bearing beams provided by the end mirrors 22 and 23 and their associated objective lenses 29 and 30. As was the case in the arrangement shown in Fig. 1, the ocular 28 also functions as the eyelet lens for the view finder, the field lens 31 of which is positioned in optical alinement with the ocular 28 and the mirror 27, which is rendered semi-transparent in any well known manner. If desired, the semi-transparent mirror 27 may be made completely reflecting and shiftably mounted so that it may readily be moved out of the path of the view finder beam of light. The mirror 27 may be mounted for sidewise movement, but, for convenience, I prefer to provide it with a suitable hinged mounting 32, so that it may be swung into the position shown in Fig. 3 for taking the range finder reading, and then swung to a horizontal position and out of the visual path of the view finder when the field of view is to be observed. This arrangement permits the use of a simple structure for so swinging the mirror 27, and one suitable structure is shown, in section, in this figure as comprising a pin member 33 secured to the mirror 27 and extending through an arcuate slot 34 provided in the view finder housing 35 in a position convenient to the operator.

While I have shown in Figs. 1 and 3 the beam combining and erecting unit positioned substantially half way between the members forming the base line of the range finder, it is to be understood that this unit may be otherwise positioned, such as at one end of the base line, as is shown in my copending application Serial No. 742,242, filed August 31, 1934.

Figure 4:
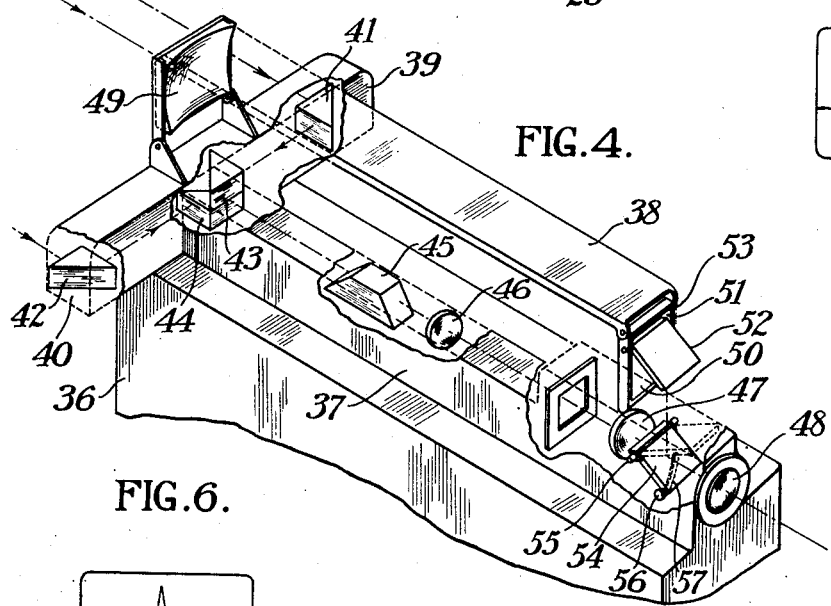
Fig. 4 is a perspective view showing a motion picture camera provided with a combined range and view finder system of my invention.

In Fig. 4 I have shown the combined range and view finder system of my invention applied to a motion picture camera and employing a range finder of the type in which the beam collecting and beam combining unit is separate from and spaced in front of the telescope system, so that the light passes serially through them, as disclosed and claimed in my Patent No. 2,029,932. In this figure a motion picture camera 36 is provided on its top side with a longitudinal housing 37 for certain elements of the range finder system. This housing 37 may conveniently form a support upon which may be mounted a suitable carrying handle 38, in the end members of which are mounted the view finder elements, as will be described below. The housing 37 is preferably expanded at its forward end to provide chambers 39 and 40, in which are mounted respectively the beam accepting light deflecting elements 41 and 42, which are here shown as being prisms. The two beams of light received by these prisms 41 and 42 are deflected onto coincidence prisms 43 and 44, respectively, which, in turn, direct the two light beams through a dove prism 45 to the objective lens 46 of a telescope having an ocular comprising two separated lenses 47 and 48. One or both of the beam accepting prisms 41 and 42 may be coupled to the focusing movement of the camera objective as described in my above-mentioned Patent No. 2,029,932.

The camera carrying handle 38 is preferably so formed, in a well known manner, to carry view finder elements, and is here shown provided with a negative lens 49 in its front hinged plate member and an eyelet opening 50 in its rear hinged plate member 51, to form a well known type of direct view finder. The rear hinged plate member 51 of the carrying handle 38 is also provided with a reflecting member 52 which is preferably hingedly secured thereto by means of a pin 53, so that the reflecting member 52 may be folded into the hinged plate member 51 when the camera is not being used. In use, the reflecting member 52 is swung out about the pin 53 to the position shown in Fig. 4, so as to receive the light emerging from the eyelet opening 50 and to direct it downwardly to intercept the optical axis of the range finder system between the lens elements 47 and 48, forming the ocular thereof. In order that this view finder beam of light may be directed through the lens 48 to the eye of the observer, a light deflecting member 54 is pivotally mounted on a pin 55 secured to the walls of the range finder housing 37. This deflecting or mirror member 54, when in the position shown in the drawing, completes the view finder system and makes it possible to observe the field of view through the lens 48 and the view finder field lens 49. If the light deflecting member 54 is made semi-transparent, the range and view finder fields may be observed simultaneously as was the case with the arrangement shown in Fig. 1. However, I prefer to use a light deflecting member 54 which is completely reflecting and provide it at its free end with a laterally extending knob 56 which projects through an arcuate slot 57, provided in the side wall of the range finder housing 37, so that the operator may move the deflecting member or mirror 54 to the position indicated in outline while the range finder is being used, and return it to the position shown in Fig. 4 when the view finder is to be used.

Figure 5:
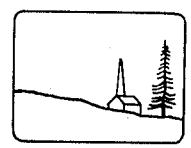
Fig. 5 shows the field of view as seen through the view finder of the arrangements shown in Figs. 3 and 4, and, Fig. 6 shows the field of view as observed through the range finder systems shown in Figs. 3 and 4.
Figure 6:
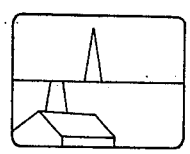

With the arrangements described in connection with Figs. 3 and 4, using a movable mirror element 27 or 54 which is fully reflective, the range finder field and the view finder field will be observed separately and selectively and will appear to the observer as shown in Figs. 6 and 5.

It will be evident from the several embodiments described above that my invention is adapted to be used with various types of range finders and view finders, and that it provides a simple and convenient arrangement whereby the range finder and the view finder may be used simultaneously, or, if desired, it provides an arrangement whereby a single ocular or observation window may be employed to view alternatively the range and view finder fields by simply altering the position of a single movable member.

While I have illustrated and described my invention as incorporated in several specific embodiments, it will be understood that I do not desire to be limited to these specific constructions, but intend to include all modifications which fall within the scope of the appended claim.

What I claim as my invention and desire to secure by Letters Patent of the United States is:

A combination range and view finder system comprising an observation opening, a view finder field lens in front of said opening and cooperating therewith to provide at a certain magnification an image of the field of view, a base type range finder having spaced beam accepting elements, beam combining units and including lens means for providing images at a magnification different from that for the field of view, and a reflecting means for directing the range finder beams through the observation opening, said reflecting means being semi-transparent and positioned in light transmitting relation between said field lens and said opening, whereby the range finder images and the view finder image are observable at different magnifications and within one apparent field.

JOSEPH MIHALYI.